(12) United States Patent
Talmola

(10) Patent No.: US 9,588,560 B2
(45) Date of Patent: Mar. 7, 2017

(54) BASEBAND PD COMMUNICATION OVER USB STANDARD A CONNECTOR

(71) Applicant: Nokia Corporation, Espoo (FI)

(72) Inventor: Pekka Talmola, Turku (FI)

(73) Assignee: Nokia Technologies Oy, Espoo (FI)

( * ) Notice: Subject to any disclaimer, the term of this patent is extended or adjusted under 35 U.S.C. 154(b) by 352 days.

(21) Appl. No.: 14/289,536

(22) Filed: May 28, 2014

(65) Prior Publication Data

US 2015/0346790 A1  Dec. 3, 2015

(51) Int. Cl.
G06F 13/00 (2006.01)
G06F 1/26 (2006.01)
G06F 13/40 (2006.01)
G06F 13/38 (2006.01)

(52) U.S. Cl.
CPC ............ G06F 1/266 (2013.01); G06F 13/385 (2013.01); G06F 13/4022 (2013.01); G06F 13/4068 (2013.01)

(58) Field of Classification Search
None
See application file for complete search history.

(56) References Cited

U.S. PATENT DOCUMENTS 7,501,792 B2 * 3/2009 Borjeson ............... G06F 13/385
320/106
8,225,114 B2 * 7/2012 Li ......................... H02J 7/0052
320/107
2007/0077817 A1 * 4/2007 Guo .................. H01R 13/6675
439/607.41
2013/0217274 A1 * 8/2013 Bar-Niv ................ H01R 27/02
439/676
2013/0326094 A1 * 12/2013 Yu .......................... G06F 11/267
710/15
2014/0178015 A1 * 6/2014 Tong ..................... G02B 6/4284
385/88
2015/0268688 A1 * 9/2015 Leinonen .................. G05F 3/02
307/147
2016/0085272 A1 * 3/2016 Chien ................... G06F 13/4022
361/679.4

FOREIGN PATENT DOCUMENTS

| CN | 101335535 A | 12/2008 |
|---|---|---|
| WO | WO-2008068552 A1 | 6/2008 |
| WO | WO-2009063278 A1 | 5/2009 |
| WO | WO-2013168289 A1 | 11/2013 |

* cited by examiner

*Primary Examiner* — Elias Mamo
(74) *Attorney, Agent, or Firm* — Pedro F. Suarez, Esq.; Mintz Levin Cohn Ferris Glovsky and Popeo, P.C.

(57) ABSTRACT

In some example embodiments, there may be provided an apparatus. The apparatus may include a first interface including a first voltage terminal and at least one data interface terminal and a second interface including a second voltage terminal and at least one configuration channel terminal, wherein the first voltage terminal is coupled to the at least one configuration channel terminal by at least a pull-up circuitry configured to cause a predetermined voltage at the at least one configuration channel terminal, and wherein the at least one configuration channel terminal is coupled to the at least one data interface terminal to enable communication between the at least one data interface terminal and the at least one configuration channel terminal. Related methods, systems, and articles of manufacture are also disclosed.

23 Claims, 8 Drawing Sheets

Type C power supply

Type C captive cable charger under the US 9,588,560 B2 header>

BASEBAND PD COMMUNICATION OVER USB STANDARD A CONNECTOR

FIELD

The subject matter described herein relates to interfaces including connectors.

BACKGROUND

Physical connectors, such as the connector used with the Universal Serial Bus (USB), can be used to couple devices. USB standards may be used to define physical and electrical aspects of USB. Examples of those standards include the Universal Serial Bus 3.1 Specification and Universal Serial Bus 2.0 and 3.0 Specifications, as well as any additions, revisions, and updates thereto. More recently, the USB Type-C connector has emerged as a USB-type connector having a relatively small size, when compared to the USB Type-A (also referred to as Standard A) and Type-B (also referred to micro-B).

SUMMARY

Methods and apparatus, including computer program products, are provided for connectivity.

In some example embodiments, there may be provided an apparatus. The apparatus may include a first interface including a first voltage terminal and at least one data interface terminal and a second interface including a second voltage terminal and at least one configuration channel terminal, wherein the first voltage terminal is coupled to the at least one configuration channel terminal by at least a pull-up circuitry configured to cause a predetermined voltage at the at least one configuration channel terminal, and wherein the at least one configuration channel terminal is coupled to the at least one data interface terminal to enable communication between the at least one data interface terminal and the at least one configuration channel terminal.

In some variations, one or more of the features disclosed herein including the following features can optionally be included in any feasible combination. The first voltage terminal may be coupled to the second voltage terminal. The at least one data interface terminal may include at least one data terminal of a data interface. The at least one data terminal may include a first data terminal and a second data terminal, and wherein the second data terminal may be coupled to a data ground terminal of the data interface to enable, when connected to a charger, coupling of the first data terminal to the data ground terminal via the second data terminal. The first data terminal may include a positive data reception terminal and the second data terminal comprises a negative data reception terminal. The at least one data interface terminal may include a data ground terminal of a data interface. The apparatus may further include a switch coupling the data ground terminal to the at least one configuration channel terminal, when a predetermined voltage is detected at a data terminal of the data interface. The data terminal may include a data reception terminal. The pull-up circuitry may include at least one resistor coupled between the first voltage terminal and the at least one configuration channel terminal and a zener-diode coupled between the first voltage terminal and a ground terminal of the first interface. The first interface may include a universal serial bus 3.0 interface and the second interface comprises a universal serial bus type C interface. The at least one configuration channel terminal may be coupled to the at least one data interface terminal to least carry power delivery communications.

In some example embodiments, there may be provided an apparatus, which may include an interface including a voltage terminal, at least one first level data terminal for communicating data according to a first communication protocol, and at least one second level data interface terminal for communicating data according to a second communication protocol; and power delivery communication circuitry coupled to the at least one second level data interface terminal and configured to communicate, via the second level data interface terminal, configuration data associated with a voltage at, or a current through, the voltage terminal.

In some variations, one or more of the features disclosed herein including the following features can optionally be included in any feasible combination. The at least one second level data interface terminal may include a data reception terminal. The at least one second level data interface terminal may include a data ground terminal. The at least one data terminal may be coupled to a ground potential. The at least one data terminal may include a first data terminal and second data terminal, and wherein the first data terminal and the second data terminal are short-circuited.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
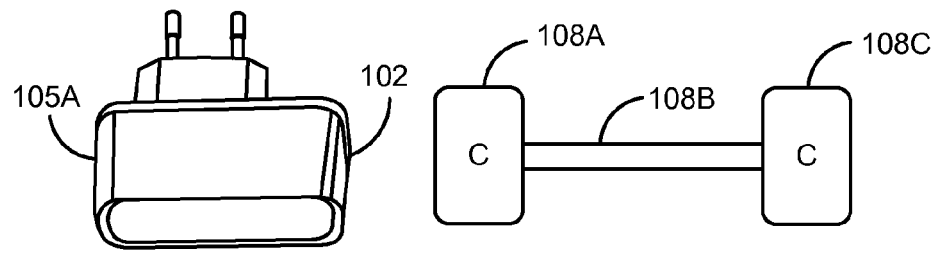
FIGS. 1 and 2 depict examples of chargers having various types of interfaces, in accordance with some example embodiments.
Figure 1:
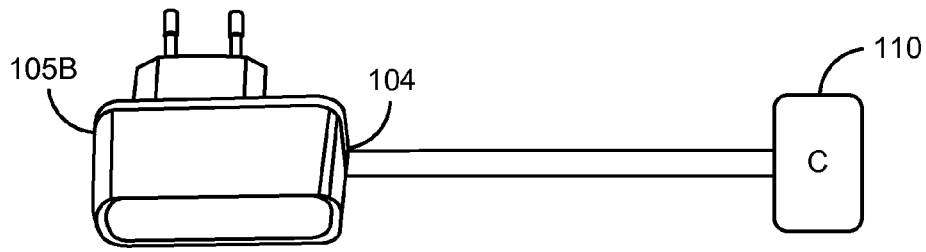

Like labels are used to refer to same or similar items in the drawings.

DETAILED DESCRIPTION

Although some of the examples disclosed herein refer to certain types of universal serial bus (USB) interfaces including connectors, other types of interfaces and connectors may be used as well in accordance with the subject matter disclosed herein. Moreover, although some of the examples show a certain pin out arrangement, other arrangements may be used as well.

With the evolution of newer types of USB connectors including the smaller Type-C connector, some products, accessories, and chargers may include the Type-C connector, such as a Type-C receptacle or a captive cable having a Type-C plug. However, many existing devices, such as chargers and the like, may consist of other types of USB connectors, such as a charger with a Type-A (also known as Standard A) connector receptacle on the power charging unit or a captive cable having a plug. Moreover, these Type-A connector-based devices may remain on the market for some time to come despite the introduction of other the Type-C connector as well as other types of USB connectors.

FIG. 1 depicts examples of USB Type-C chargers having Type-C electrical interfaces 102 and 104 at the chargers 105A-B and Type-C interfaces 108C and 110 where a device couples to be charged. Specifically, Type-C charger 105A may include a physical Type-C receptacle at which a compatible cable including connectors 108A-C may couple. Charger 105B depicts an example of a Type-C electrical interface 104 which can be coupled to a captive cable having a USB Type-C connector 110.

Figure 2:
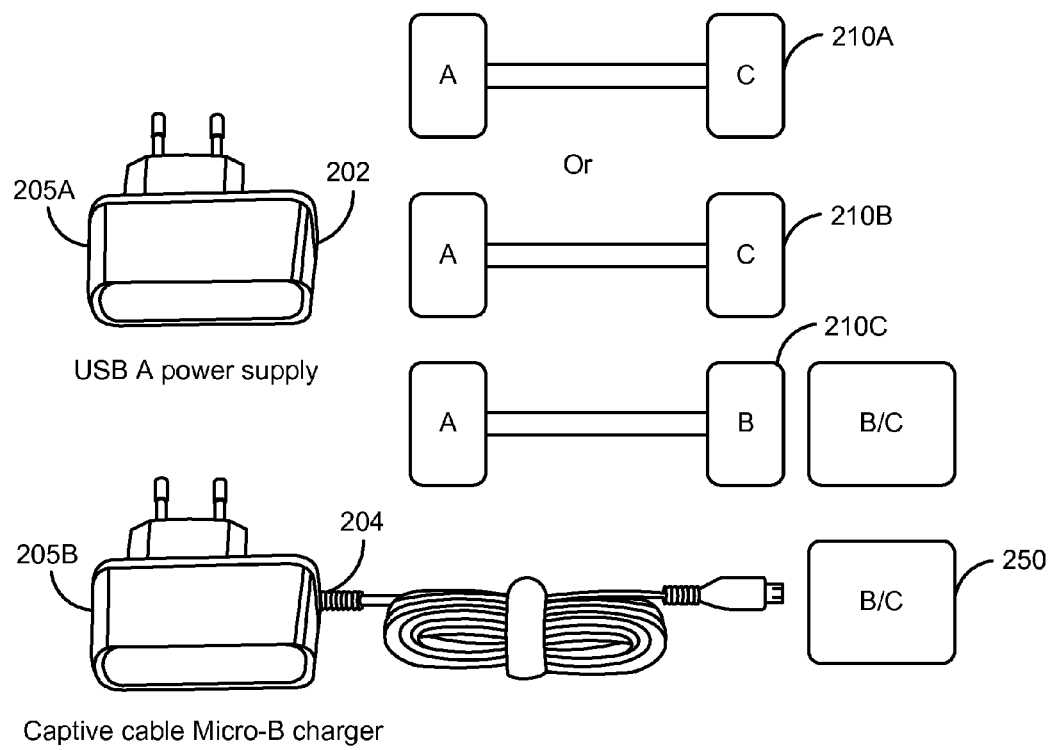

FIG. 2 depicts an example of a charger 205A having Type-A receptacle 202 into which a compatible end of cables 201A-C may be inserted. In the case of charger 205A, the receptacle 202 is compatible with Type-A, while the distal end of the cables is compatible with another format, such as Type-C or Micro-B. FIG. 2 also depicts a USB Micro-B charger 205B with Micro-B to Type-C adapter, where either Micro-B or C interfaces 250 can be used by the device to be charged.

With Type-C, the USB electrical interface provides a different way of providing Power Delivery (PD) communications. PD communications is used to coordinate and control power delivery between the charger and the device being charged. In the case if Type-C, it introduces the use of baseband signals superimposed on the Type-C Communication Control (CC)-line, unlike other types of USB in which PD communications occur over the VBUS-line using a frequency shift key (FSK) modulated radio frequency (RF) carrier (which may explain why PD communications over the VBUS line on mobile devices and chargers are rarely implemented/used). However, the move to baseband PD communications over for example the USB CC-line may simplify PD communications and may thus lead to increase use of PD communications. The baseband PD communications may be carried as shown at FIG. 1 over a Type-C receptacle or a captive cable.

Although newer types of USB interfaces may be implemented, such as the Type-C including the baseband PD communications feature noted above, it may be possible that some devices may continue to operate using the USB Type-A connector (also called Standard A), so a charger may keep a USB Type-A receptacle or captive cable as shown at FIG. 2. Implementing the baseband PD communications feature may, however, pose a problem as USB Type-A connectors do not have a pin that could be used for outputting the CC-line that carries the baseband PD. As such, these chargers having the Type-A connectors/captive cable may only be able to provide PD communications using FSK modulation via the VBUS-pin as noted above.

In some example embodiments, at least one additional contact (or pin) may be used or added to a USB Type-A (also known as Standard A) connector to allow baseband PD communications to be carried. For example, the Type-A connector may be specified to include an additional contact (or pin) so that the resulting Type-A connector would be fully backwards compatible with current USB Type-A connectors as defined by for example USB 2.0, 3.0, 3.1 and/or any subsequent additions or revisions to the USB standards. Alternatively or additionally, an existing pin of the Type-A interface may be used to carry the PD communications.

Figure 3:
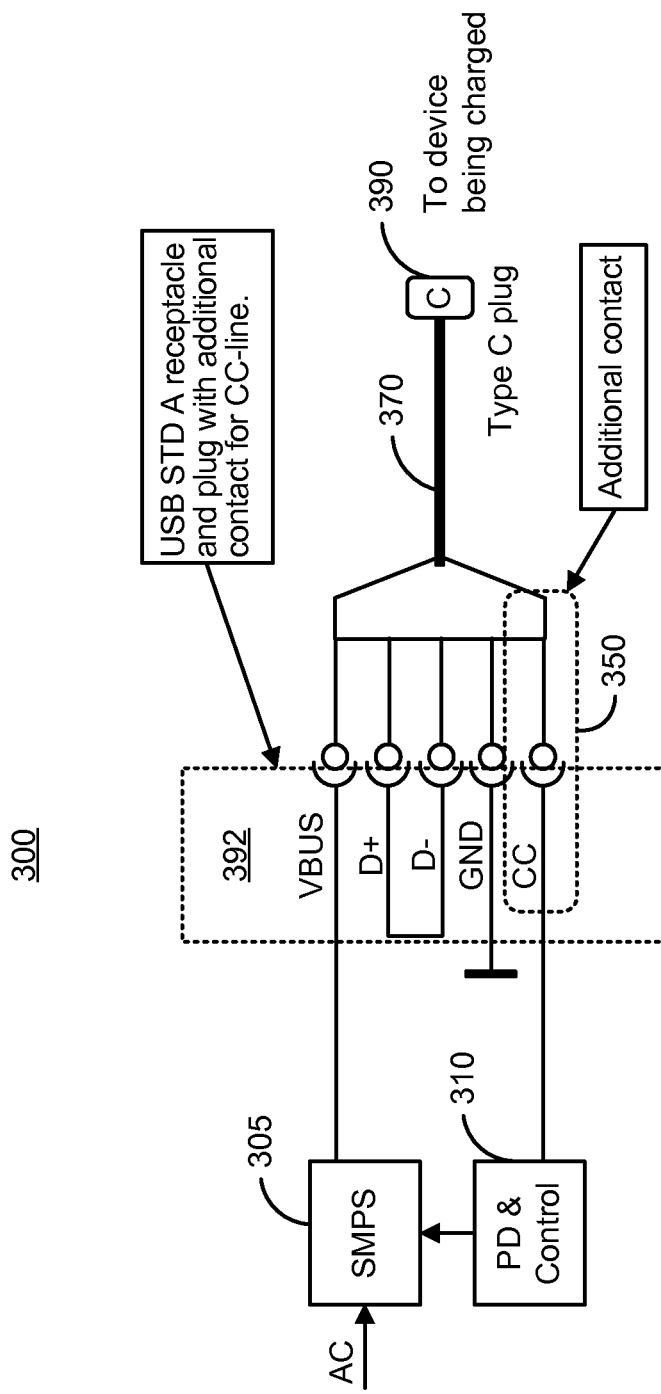
FIG. 3 depicts an example of a USB Type-A connector being augmented to carry power delivery (PD) communications, in accordance with some example embodiments.

FIG. 3 depicts an example system 300, in accordance with some example embodiments. System 300 may provide a USB charger to another device that couples at Type-C connector 390. The system 300 may include a power source 305, such as a switched-mode power source (SMPS), for converting alternating current into for example a direct current. System 300 may also include a power delivery controller 310 which controls power delivery and provides power delivery communications between the system 300 and a device being charged (which would couple at Type-C connector 390).

In some example embodiments, an additional contact 350 is added to a USB Type-A interface (for example, a contact is added to a receptacle, a plug, or a captive cable-connector). For example, USB Type-A interface 392 may at least have a ground terminal (GND), a voltage bus (VBUS), data terminals (for example, pins labeled D+ and D−), and the augmented contact 350 that couples to PD controller 310 and serves as a CC-line for the USB Type-A interface. This CC-line 350 extends through the cable 370 to the Type-C connector 390 to enable baseband PD communications in accordance with USB Type-C despite the use of a Type-A physical connector 392.

In some example embodiments, the USB charger system may include a receptacle in the charging unit and a cable, where in a first cable end at the charger itself is for example a USB 3.0 Type-A connector and the other end (which couples to the device being charged) is a USB Type-C connector. In some example embodiments, this cable may only have USB 2.0 level connectivity and include a built-in pull-up resistor for pulling the CC-line voltage level to an established or a specified connection or CC-line voltage level. This pull-up resistor may be connected to a regulated or controlled reference voltage rather than directly to the VBUS as the VBUS may vary for example between 5 and 20 Volts due to the PD communications and control.

Figure 4:
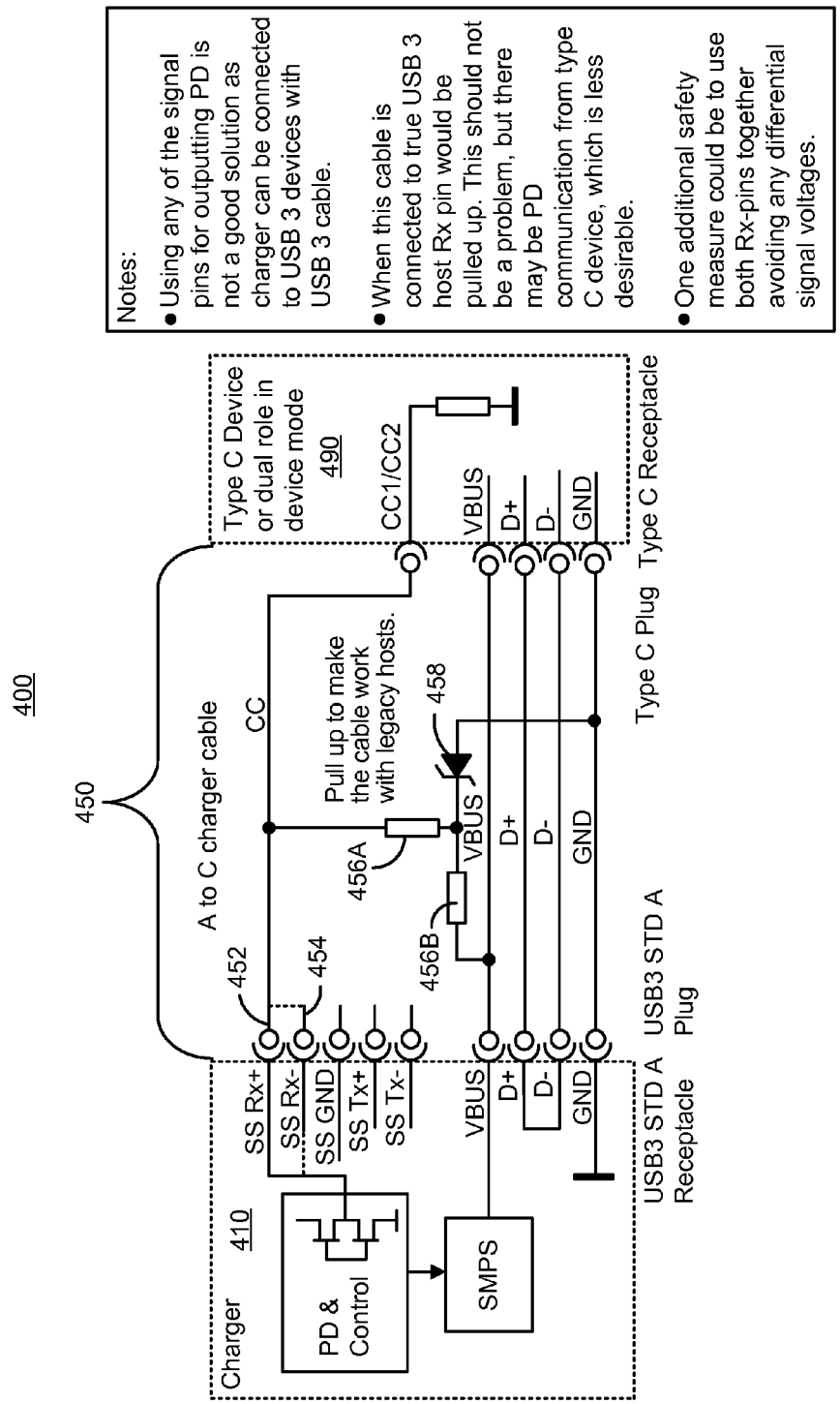
FIG. 4-7 depict examples of USB Type-A chargers using a certain pin to carry power delivery (PD) communications, in accordance with some example embodiments.

FIG. 4 depicts a system 400 including a charger 410 having a USB 3.0 Type-A receptacle into which a first end of cable 450 is coupled, in accordance with some example embodiments. The USB 3.0 Type-A receptacle may comprise a USB 2.0 interface with a voltage bus terminal (VBUS), a ground terminal, and one or more data communication pins (for example, D+/− and the like). USB 3.0 Type A receptacle may further comprise a plurality of USB 3.0 data interface terminals. The plurality of data interface terminals may include for example one or more USB 3.0 data terminals/pins (labeled as for example SS TX+, SS TX−, SS RX+, and SS TX− at FIG. 4) for transmitting and receiving data and at least one data ground terminal/pin (for example, labeled as SS GND at FIG. 4) that may be used as a reference potential for the data terminals. Cable 450 may also couple to a USB Type-C receptacle at device 490. In the example embodiment of FIG. 4, one of the USB 3.0 data terminals, such as the Rx pin or Tx pin, may be used as a CC-line to carry PD communications. In the example of FIG. 4, the Rx pin 452 is selected to function as a CC-line and carry baseband PD communications between USB charger 410 having a USB 3.0 Type-A receptacle and the Type-C device 490. Although a single Rx pin 452 is used in the example of FIG. 4, Rx pin 454 may be used as well. For example, both pins 452 and 454 may be used to prevent differential signal voltages from being generated on the bus. FIG. 4 also depicts a pull-up resistors 456A-B that pull-up the voltage on the Rx pin 452 to a voltage high to provide a specified voltage for line 452 now acting as a CC-line. The Zener diode 458 and resistor 456B may provide a stable reference voltage (for example, +5 Volts) from the 5 Volt to 20 Volt VBUS. In this way, the pull-up resistor 456A creates a constant current to the Type-C pull-down resistor 456A independently of a given VBUS voltage. The use of the Rx pin 452 may be somewhat safer because if the charger is connected to a USB 3.0 host or device with a full USB 3.0 cable, any outgoing PD signaling from the charger is then connected back to back with Tx-pin from the other device.

Although FIG. 4, as well as some of the other examples described herein, shows a Type-A receptacle at the charger, the Type-A receptacle may be an interface for a captive cable as well. Moreover, although reference is made in the description of FIG. 4 (as well as some of the other examples described herein) to specific version of USB, these are merely examples as other versions of USB may be used as well.

Figure 5:
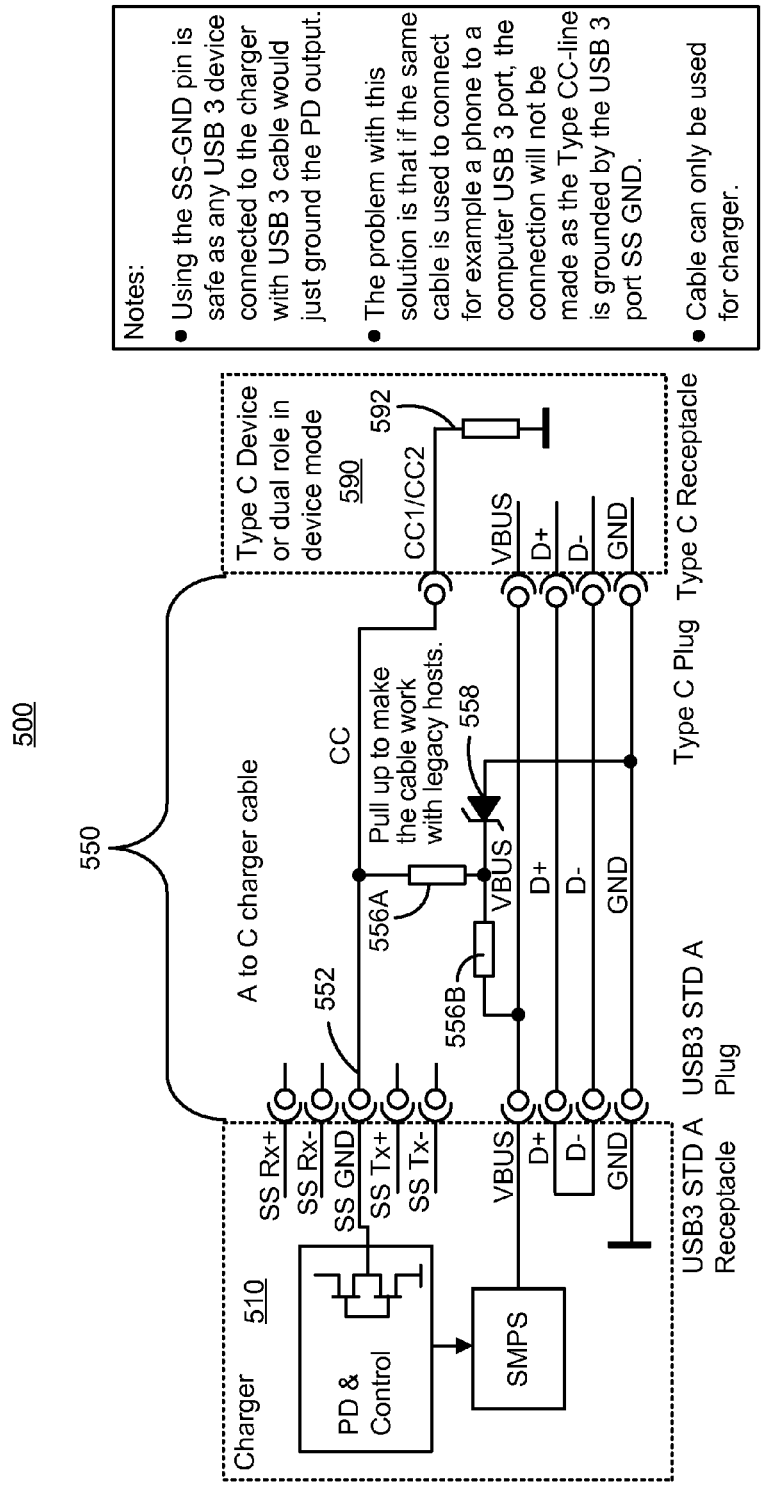

FIG. 5 depicts a system 500 including a charger 510 having a USB Type-A receptacle into which a first end of cable 550 is coupled, in accordance with some example embodiments. Cable 550 may also couple to a USB Type-C receptacle at device 590. In the example embodiment of FIG. 5, one of the USB 3.0 data interface pins is used as a CC-line, and this pin is a data ground (GND) pin 552. In the example of FIG. 5, the power and control circuitry is coupled to the data ground pin (SS GND) at the USB Type-A receptacle and GND pin 552 of the cable. Moreover, the GND pin 552 operates as a CC-line and carries baseband PD communications between charger 510 and Type-C device 590. FIG. 5 also depicts a pull-up circuitry including for example resistors 556A-B and Zener diode 558 that pulls-up the voltage on the GND pin 552 to a voltage high, such as a required or specified voltage level(s) for the CC-line.

In the case of FIG. 5, the charger-based use of the GND pin 552 does not mix PD communications and control baseband signaling carried by the GND pin 552 and CC-line 592 with any other signaling which might be carried by other USB pins. However, cable 550 can only be used in charging applications because other applications that use the CC-line may find that line grounded at the Type-C device 590. For example, if a host device, such as a user equipment, PC, music player, and/or any other device, is coupled to cable 550 instead of charger 510, cable 550 will drag the Type C device CC-line 592 to ground and thus disable the CC-line.

Figure 6:
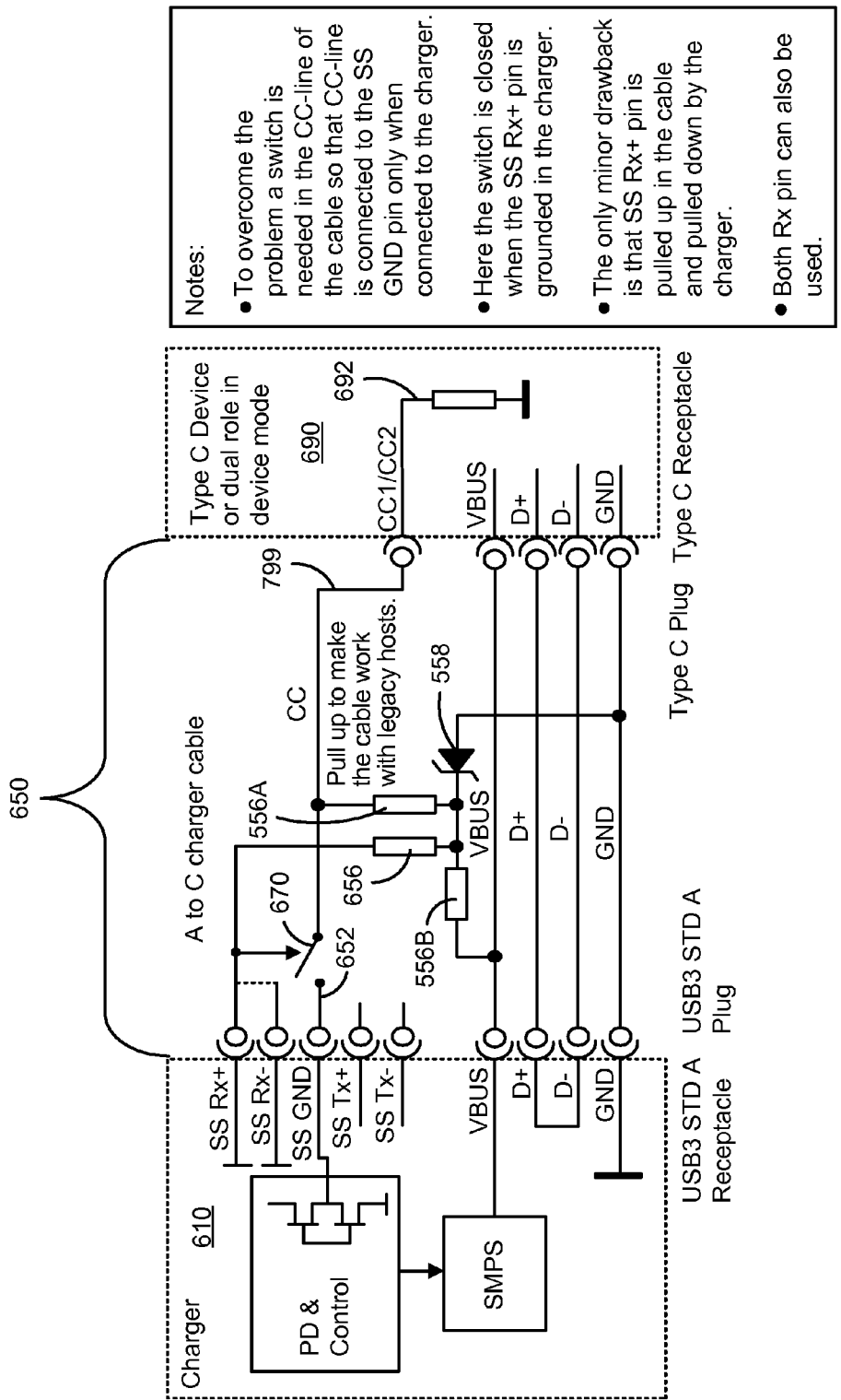

FIG. 6 depicts an example of a charger device 610 coupled via cable 650 to a Type-C device 690, in accordance with some example embodiments. FIG. 6 is similar to FIG. 5 in some respects as both use the data ground (GND) terminal (552/652), but in the case of FIG. 6 cable 650 includes an additional switch 670 between the CC-line 692 and GND pin 652. The switch 670 may be closed to enable PD baseband communications between the CC-line 692 and GND pin 652, when charger 610 is connected. But switch 670 may be open to disconnect the CC-line 692 and GND pin 652 connection to allow other hosts (for example, that are not chargers) to couple to device 690 while not disabling the CC-line 692 to ground as noted above.

In the example of FIG. 6, switch 670 may be closed when the data terminal Rx+ pin (and/or Rx− pin) is pulled to ground by the charger 610 coupling to cable 650. In this way, switch 670 is only closed when the cable 650 is connected to the charger 610. In the example of FIG. 6, one or both of the Rx pins at the charger 610 may be grounded. The lines in the cable connected to these Rx pins are typically pulled up by a resistor 656, but when the cable 650 is connected to the charger 610, the lines are pulled to ground triggering switch 670 to close.

Figure 7:
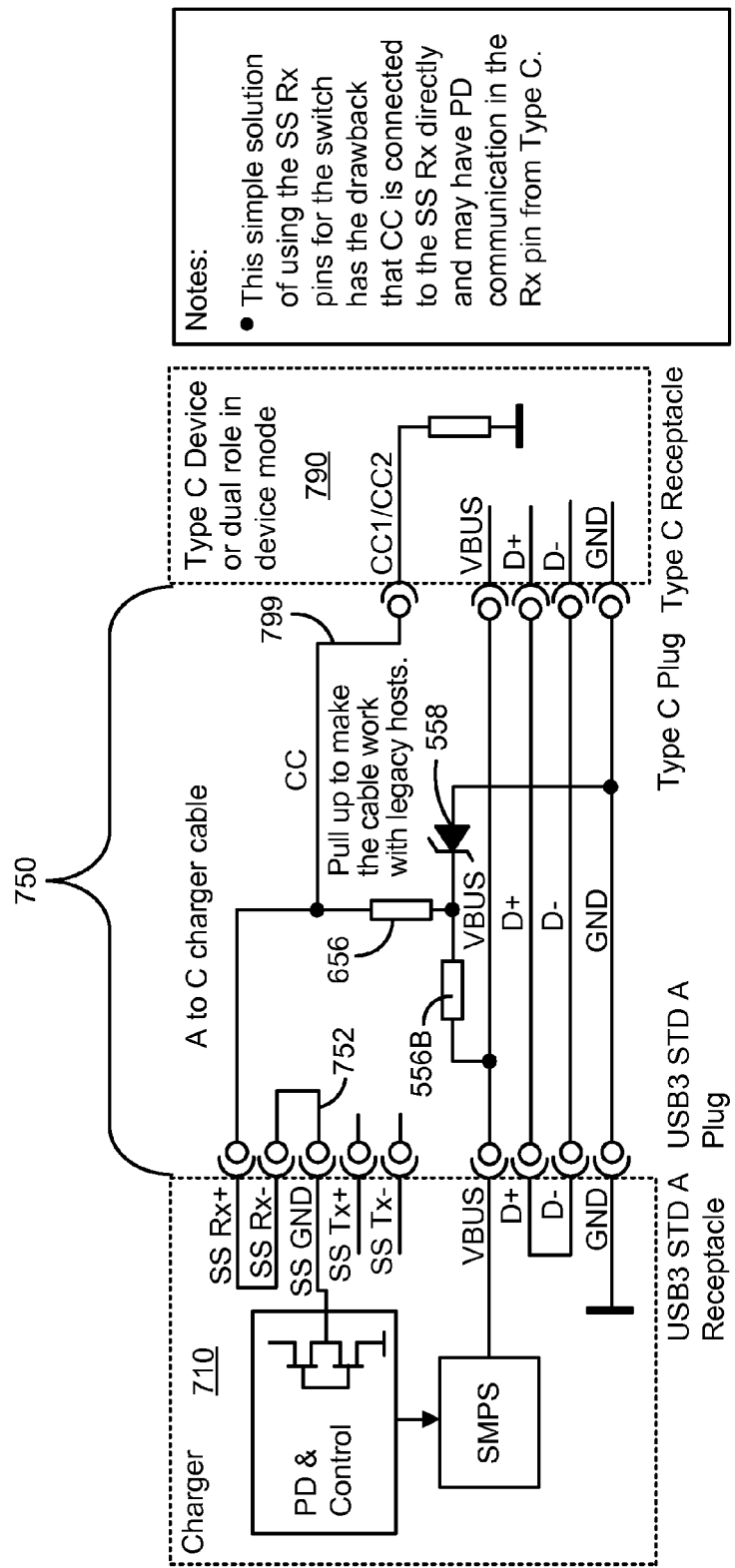

FIG. 7 depicts a charger 710 coupled to device 790 via cable 750, in accordance with some example embodiments. FIG. 7 is similar to FIG. 6 in some respects but implements the switch of FIG. 6 using just the Rx pins 710. The CC-line 799 couples via Rx+ and Rx− pins (shorted together in the charger) back to the GND pin 752 in the cable 750, and the GND pin carries the PD communications. If the same cable 750 is connected to a normal USB 3.0 host, the CC-line 799 is not grounded as the Rx+ pin is floating but Rx− in the host will be grounded via the cable, although this does not matter or harm the host.

Figure 8:
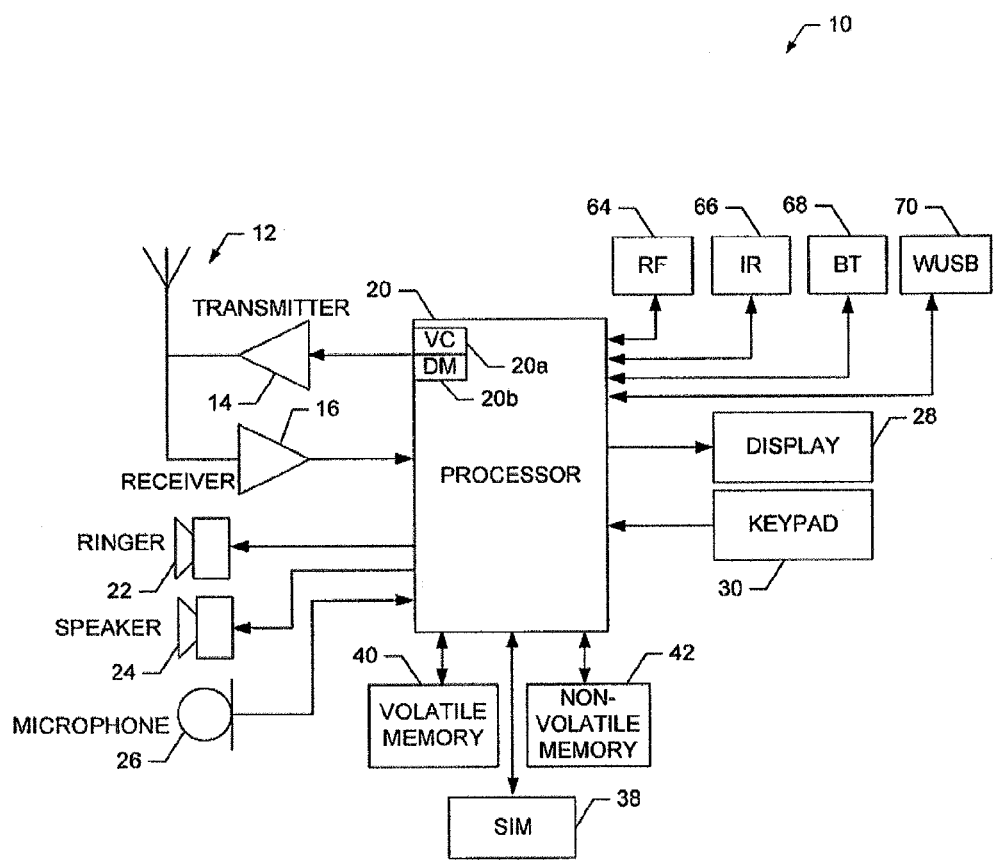
FIG. 8 depicts an example of a user equipment, in accordance with some example embodiments.

FIG. 8 illustrates a block diagram of an apparatus 10, in accordance with some example embodiments. For example, apparatus 10 may be implemented as (or include) a host, an accessory, a charger, and/or any other device. The apparatus may be implemented as a user equipment, such as a smart phone, a source of audio (for example, a microphone and the like), a sink of audio (for example, a speaker), a microphone, a headset, a digital headset, a television, a tablet, and/or any other device.

The apparatus 10 may, in some example embodiments, include at least one antenna 12 in communication with a transmitter 14 and a receiver 16. Alternatively transmit and receive antennas may be separate.

The apparatus 10 may, in some example embodiments, also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 8 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 8, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus to perform one or more of the operations disclosed herein with respect to the host, accessory device, and/or extension device. The memories may comprise an identifier, such as an international mobile equipment identification (IMEI) code, capable of uniquely identifying apparatus 10. The functions may include one or more of the operations disclosed with respect to host, accessory device, and/or charger. The memories may comprise an identifier, such as an international mobile equipment identification (IMEI) code, capable of uniquely identifying apparatus 10. In the example embodiment, the processor 20 may be configured using computer code stored at memory 40 and/or 42 to perform one or more of the operations disclosed herein with respect to host, accessory device, and/or charger.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 8, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is backward compatibility between Type-C connectors and earlier connectors, such as Type-A.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments may comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the some of the embodiments as defined in the appended claims. Other embodiments may be within the scope of the following claims. The term "based on" includes "based on at least." The use of the phase "such as" means "such as for example" unless otherwise indicated.

What is claimed is:

1. An apparatus comprising:
a first interface including a first voltage terminal and at least one data interface terminal; and
a second interface including a second voltage terminal and at least one configuration channel terminal,
wherein the first voltage terminal is coupled to the at least one configuration channel terminal by at least a pull-up circuitry configured to cause a predetermined voltage at the at least one configuration channel terminal, and
wherein the at least one configuration channel terminal is coupled to the at least one data interface terminal to enable communication between the at least one data interface terminal and the at least one configuration channel terminal.

2. The apparatus of claim 1, wherein the first voltage terminal is coupled to the second voltage terminal.

3. The apparatus of claim 1, wherein the at least one data interface terminal includes at least one data terminal of a data interface.

4. The apparatus of claim 3, wherein the at least one data terminal comprises a first data terminal and a second data terminal, and wherein the second data terminal is coupled to a data ground terminal of the data interface to enable, when connected to a charger, coupling of the first data terminal to the data ground terminal via the second data terminal.

5. The apparatus of claim 4, wherein the first data terminal comprises a positive data reception terminal and the second data terminal comprises a negative data reception terminal.

6. The apparatus of claim 1, wherein the at least one data interface terminal comprises a data ground terminal of a data interface.

7. The apparatus of claim 6 further comprising:
a switch coupling the data ground terminal to the at least one configuration channel terminal, when a predetermined voltage is detected at a data terminal of the data interface.

8. The apparatus of claim 7, wherein the data terminal comprises a data reception terminal.

9. The apparatus of claim 1, wherein the pull-up circuitry comprises at least one resistor coupled between the first voltage terminal and the at least one configuration channel terminal and a zener-diode coupled between the first voltage terminal and a ground terminal of the first interface.

10. The apparatus of any claim 1, wherein the first interface includes a universal serial bus 3.0 interface and the second interface comprises a universal serial bus type C interface.

11. The apparatus of claim 1, wherein the at least one configuration channel terminal is coupled to the at least one data interface terminal to least carry power delivery communications.

12. A method comprising:
receiving, at a cable assembly, signaling associated with power delivery, wherein the cable assembly further includes a first interface including a first voltage terminal and at least one data interface terminal and a second interface including a second voltage terminal and at least one configuration channel terminal, wherein the first voltage terminal is coupled to the at least one configuration channel terminal by at least a pull-up circuitry configured to cause a predetermined voltage at the at least one configuration channel terminal, and wherein the at least one configuration channel terminal is coupled to the at least one data interface terminal to enable communication between the at least one data interface terminal and the at least one configuration channel terminal.

13. The method of claim 12, wherein the first voltage terminal is coupled to the second voltage terminal.

14. The method of claim 12, wherein the at least one data interface terminal includes at least one data terminal of a data interface.

15. The method of claim 14, wherein the at least one data terminal comprises a first data terminal and a second data terminal, and wherein the second data terminal is coupled to a data ground terminal of the data interface to enable, when connected to a charger, coupling of the first data terminal to the data ground terminal via the second data terminal.

16. The method of claim 15, wherein the first data terminal comprises a positive data reception terminal and the second data terminal comprises a negative data reception terminal.

17. The method of claim 12, wherein at least one data interface terminal comprises a data ground terminal of a data interface.

18. The method of claim 17, further comprising:
coupling, by a switch, the data ground terminal to the at least one configuration channel terminal, when a predetermined voltage is detected at a data terminal of the data interface.

19. The method of claim 18, wherein the data terminal comprises a data reception terminal.

20. The method of claim 12, wherein the pull-up circuitry comprises at least one resistor coupled between the first voltage terminal and the at least one configuration channel terminal and a zener-diode coupled between the first voltage terminal and a ground terminal of the first interface.

21. The method of claim 12, wherein the first interface includes a universal serial bus 3.0 interface and the second interface comprises a universal serial bus type C interface.

22. The method of claim 12, wherein the at least one configuration channel terminal is coupled to the at least one data interface terminal to least carry power delivery communications.

23. A non-transitory computer-readable storage medium including program code which when executed by at least one processor causes operations comprising:
receiving, at a cable assembly, signaling associated with power delivery, wherein the cable assembly further includes a first interface including a first voltage terminal and at least one data interface terminal and a second interface including a second voltage terminal and at least one configuration channel terminal, wherein the first voltage terminal is coupled to the at least one configuration channel terminal by at least a pull-up circuitry configured to cause a predetermined voltage at the at least one configuration channel terminal, and wherein the at least one configuration channel terminal is coupled to the at least one data interface terminal to enable communication between the at least one data interface terminal and the at least one configuration channel terminal.

* * * * *